US006754732B1

(12) United States Patent
Dixon et al.

(10) Patent No.: US 6,754,732 B1
(45) Date of Patent: Jun. 22, 2004

(54) SYSTEM AND METHOD FOR EFFICIENT DATA TRANSFER MANAGEMENT

(75) Inventors: Huey P. Dixon, Rowlett, TX (US); Roland El-Khoury, Flower Mound, TX (US); Steve L. Hankins, Carrollton, TX (US)

(73) Assignee: Intervoice Limited Partnership, Reno, NV (US)

( * ) Notice: Subject to any disclaimer, the term of this patent is extended or adjusted under 35 U.S.C. 154(b) by 274 days.

(21) Appl. No.: 09/921,939

(22) Filed: Aug. 3, 2001

(51) Int. Cl.[7] .............................................. G06F 13/28
(52) U.S. Cl. ....................................... 710/22; 710/33
(58) Field of Search ....................... 710/22–28, 33–35, 710/72

(56) References Cited

U.S. PATENT DOCUMENTS

| | | | | |
|---|---|---|---|---|
| 5,634,099 A | * | 5/1997 | Andrews et al. | 395/200 |
| 5,708,779 A | * | 1/1998 | Graziano et al. | 395/200 |
| 5,781,799 A | * | 7/1998 | Leger et al. | 395/842 |
| 5,870,627 A | | 2/1999 | O'Toole et al. | |
| 6,049,842 A | * | 4/2000 | Garrett et al. | 710/33 |
| 6,078,971 A | | 6/2000 | Tsutsumi | |
| 6,092,127 A | * | 7/2000 | Tausheck | 710/56 |
| 6,145,061 A | * | 11/2000 | Garcia et al. | 711/154 |

OTHER PUBLICATIONS

Limitations of Standard DMA, (online) retrieved from www.pcguide.com/ref/mbsys/res/dma/funcLimitations–c.html, retrieved on Jun. 28, 2000 (2 pages).
DMA Controllers, (online) retrieved from www.pcguide.com/ref/mbsys/res/dma/funcControllers–c.html, retrieved on Jun. 28, 2000 (2 pages).
DMA Channels and the System Bus, (online) retrieved from www.pcguide.com/ref/mbsys/res/dma/funcChannels–c.html, retrieved on Jun. 28, 2000 (2 pages).
DMA, Multiple Devices and Conflicts, (online) retrieved from www.pcguide.com/ref/mbsys/res/dma/funcConflicts–c.html, retrieved on Jun. 28, 2000 (2 pages).

Summary of DMA Channels and Their Typical Uses, (online) retrieved from www.pcguide.com/ref/mbsys/res/dma/funcSummary–c.html, retrieved on Jun. 28, 2000 (2 pages).
DMA Request (DRQ) and DMA Acknowledgment (DACK), (online) retrieved from www.pcguide.com/ref/mbsys/res/dma/funcDRQ–c.html, retrieved on Jun. 28, 2000 (1 page).
DMA Channel Function and Operation, (online) retrieved from www.pcguide.com/ref/mbsys/res/dma/func–i.htm, retrieved on Jun. 28, 2000 (1 page).
Direct Memory Access (DMA) Channels, (online) retrieved from www.pcguide.com/ref/mbsys/res/dma/index–c.html, retrieved on Jun. 28, 2000 (1 page).
Why DMA Channels Were Invented for Data Transfer, (online) retrieved from www.pcguide.com/ref/mbsys/res/dma/funcWhy–c.html, retrieved on Jun. 28, 2000 (2 pages).
Third–Party and First–Party DMA (Bus Mastering), (online) retrieved from www.pcguide.com/ref/mbsys/res/dma/funcParties–c.html, retrieved Jun. 28, 2000 (2 pages).

* cited by examiner

*Primary Examiner*—Jeffrey Gaffin
*Assistant Examiner*—Alan Chen
(74) *Attorney, Agent, or Firm*—Fulbright & Jaworski LLP

(57) ABSTRACT

A system and method are disclosed which utilize an enhanced direct memory access (DMA) to both perform a desired data transfer and update data queue directories as needed to properly reflect such data transfer. The enhanced DMA is implemented to receive a data transfer request that comprises at least one data transfer descriptor indicating the desired data transfer, and at least one record update descriptor indicating one or more data queue directories to be updated to properly reflect the desired data transfer. In response, the enhanced DMA both performs the desired data transfer and updates one or more data queue directories to properly reflect such data transfer within the data queue directories. Thereafter, the enhanced DMA notifies the requesting driver that the desired data transfer operation is complete.

27 Claims, 8 Drawing Sheets

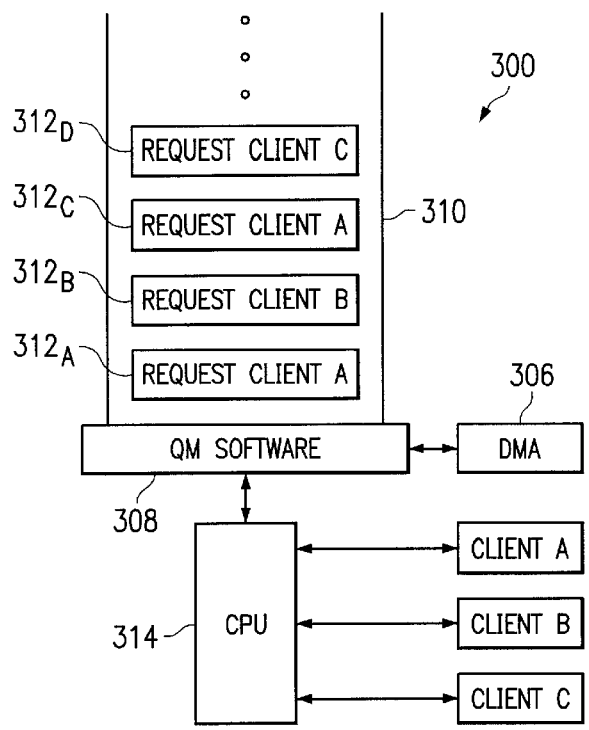
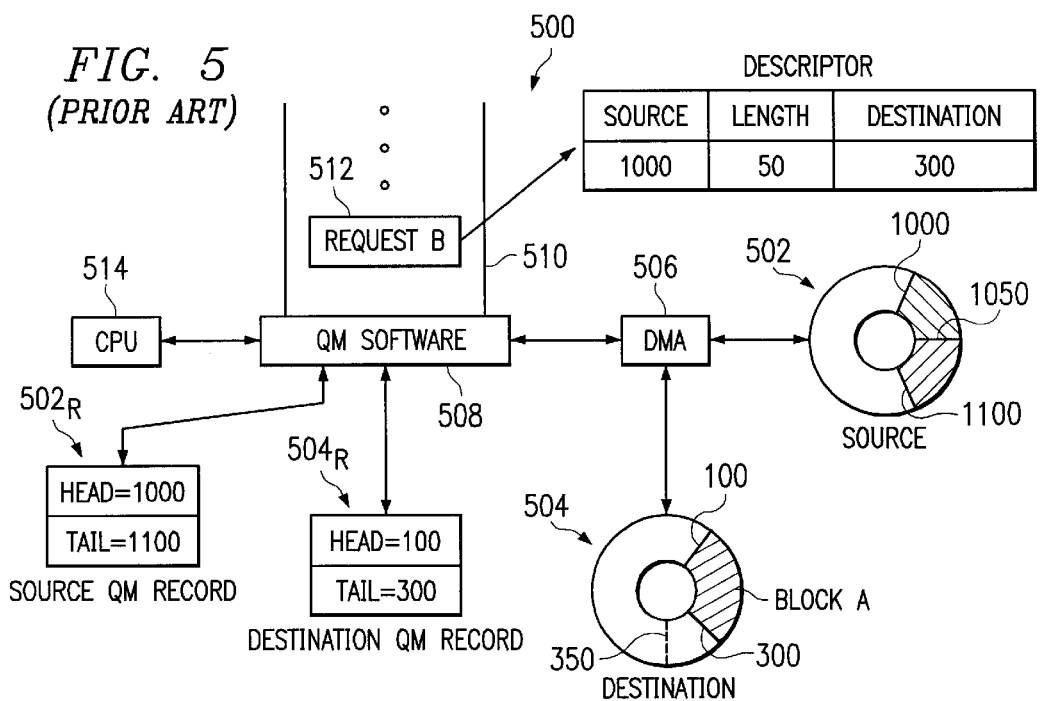

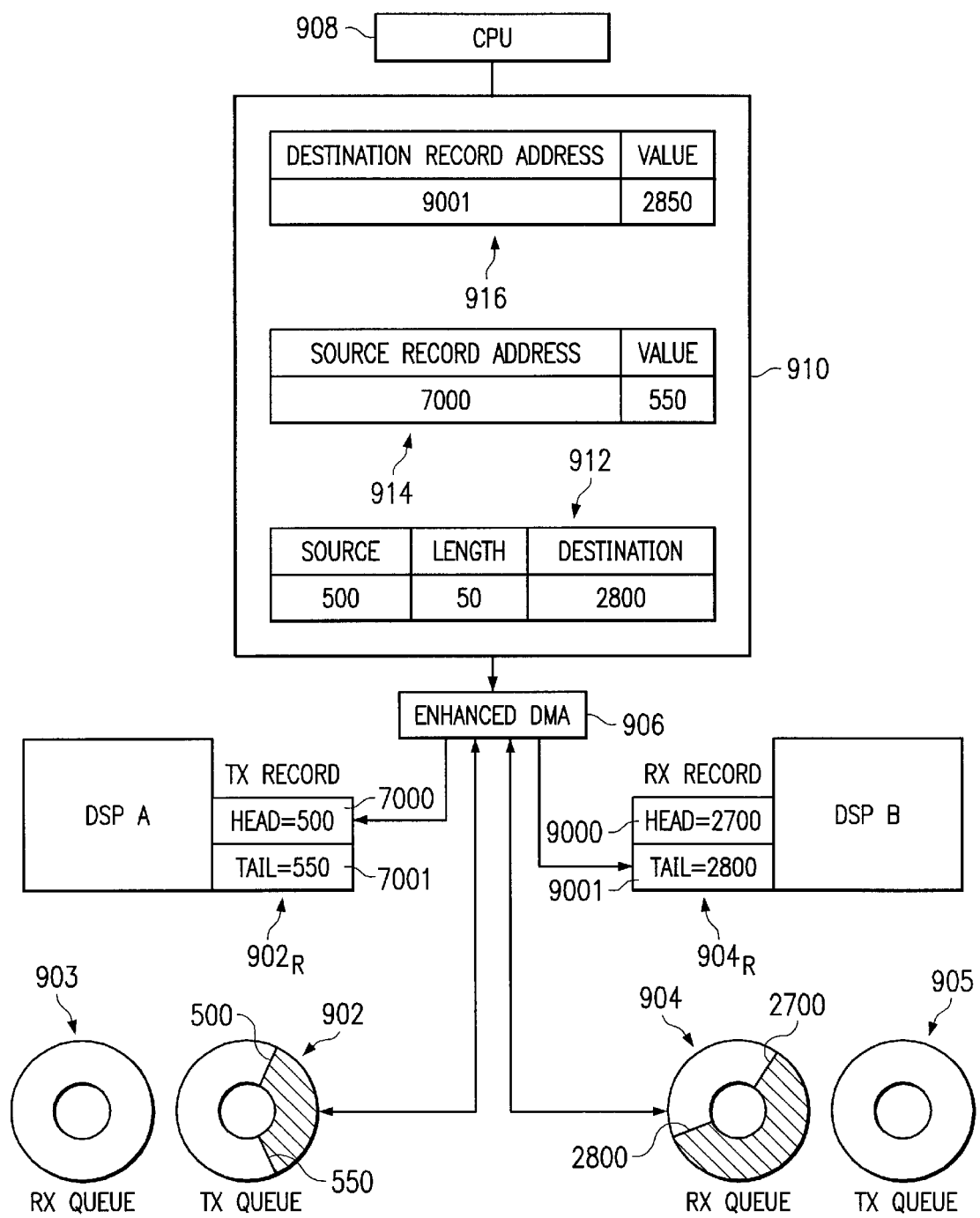

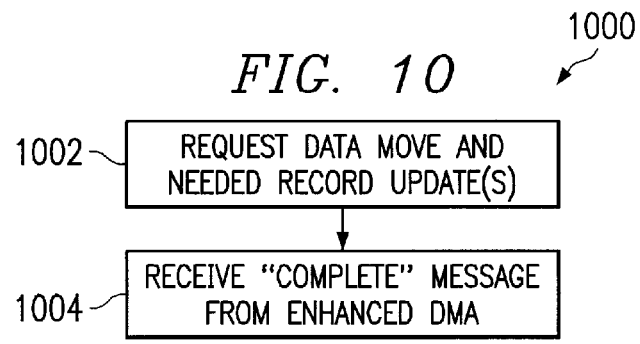
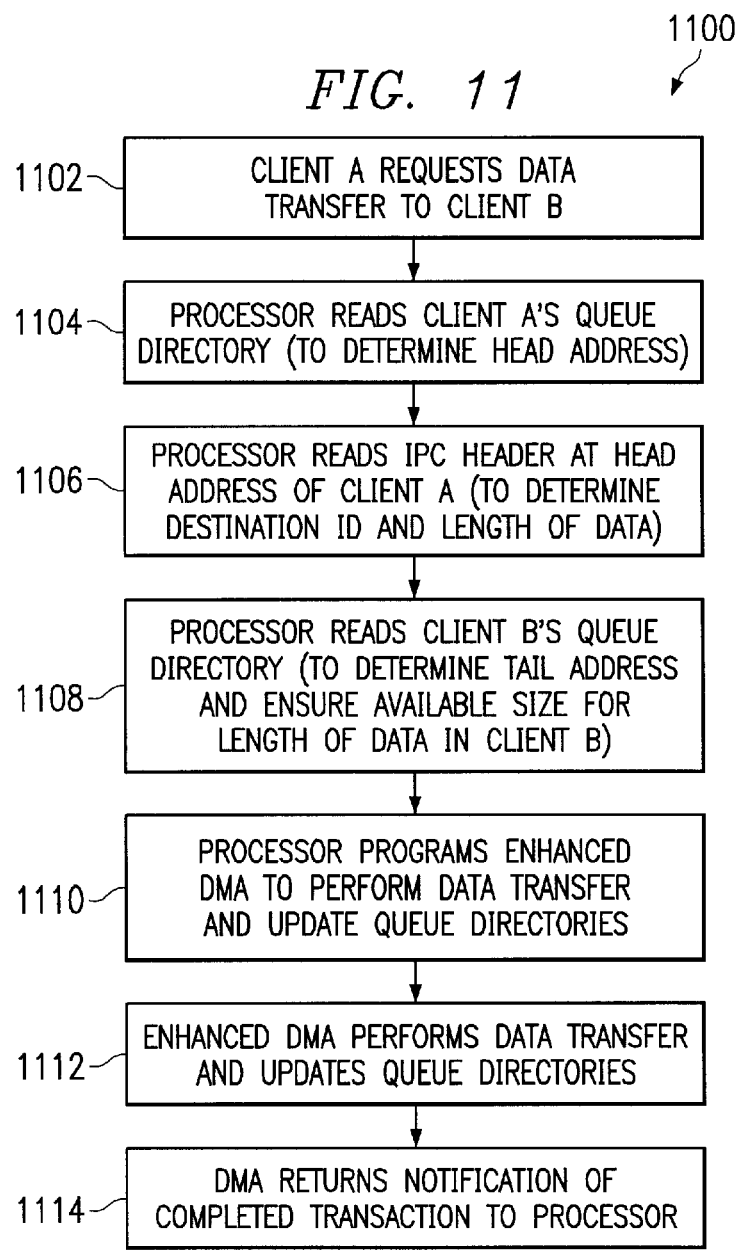

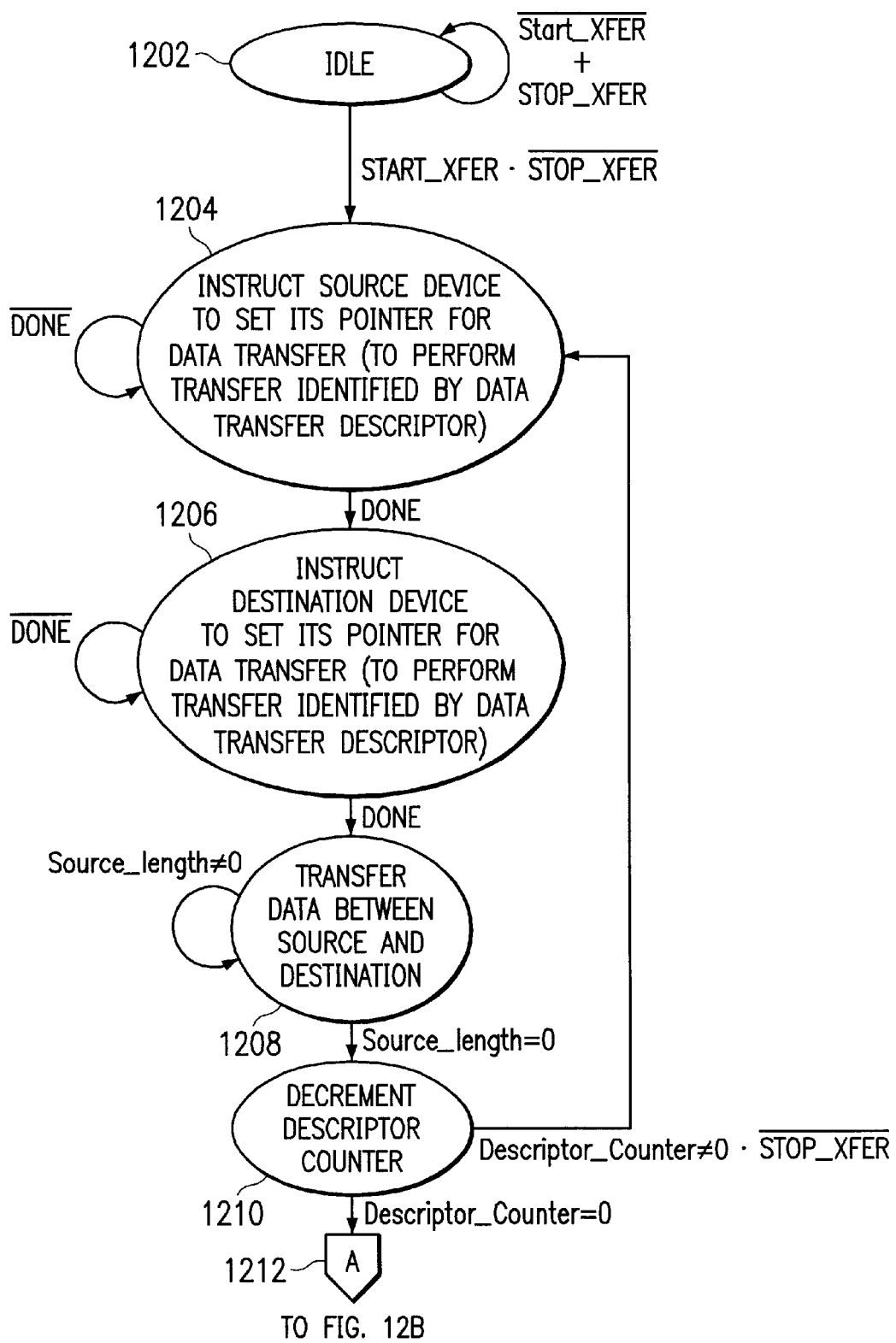

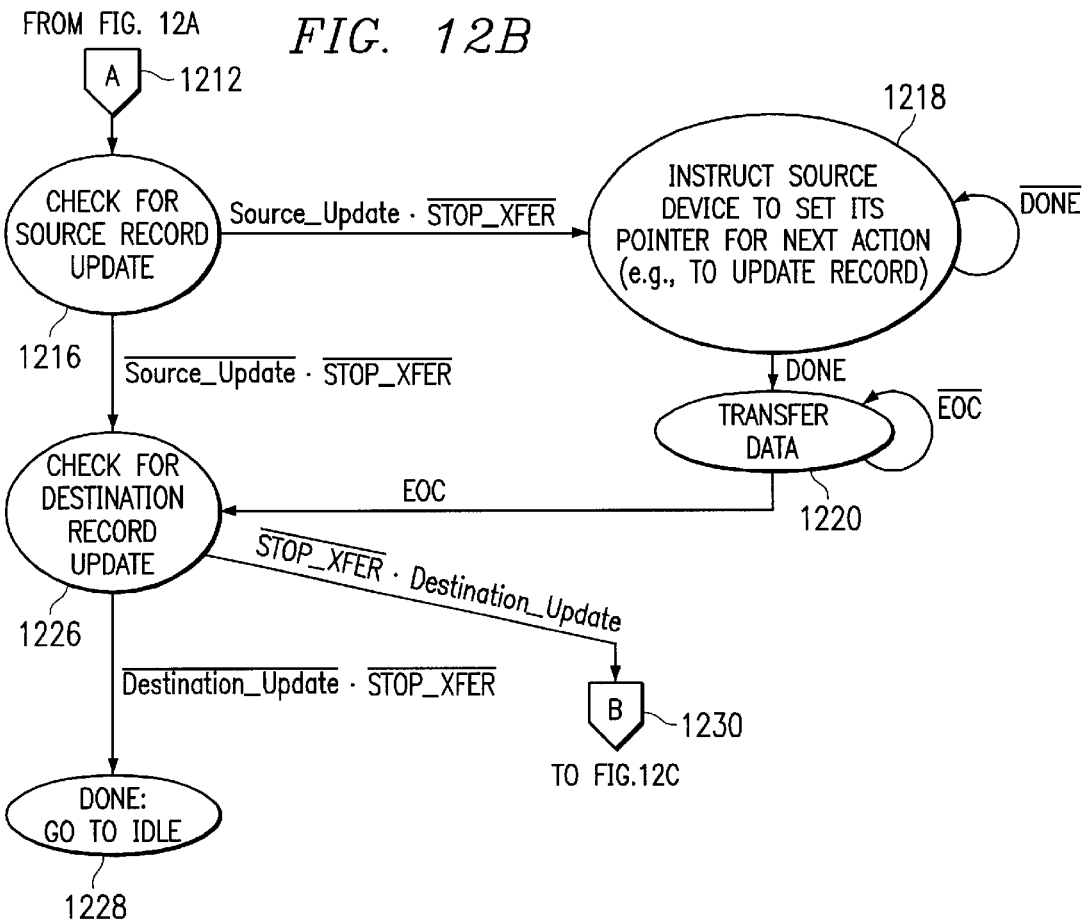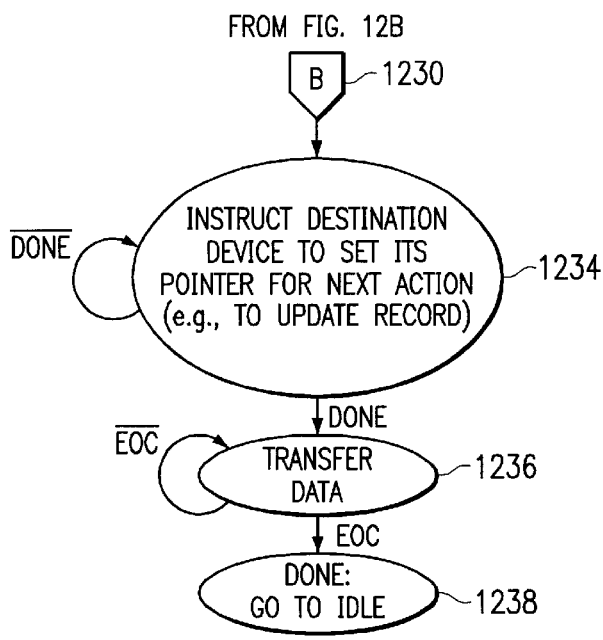

SYSTEM AND METHOD FOR EFFICIENT DATA TRANSFER MANAGEMENT

TECHNICAL FIELD

The present invention relates in general to a system and method for efficiently performing direct memory access operations, and in specific to a method and system that utilizes an enhanced direct memory access controller to perform both a desired data transfer operation and one or more data queue directory updates to properly reflect such desired data transfer.

BACKGROUND

Computer systems are heavily relied on today for performing a variety of tasks. Such computer systems are often required to handle data in some manner. For example, data is often transferred from one memory location (or address) to another memory location (or address). For instance, data may be transferred from one device to another device, from one device to memory, from a software application to a device, from a software application to memory, etcetera. Computer systems generally include at least one central processing unit (CPU or processor), which acts as the electronic "brain" of a computer device. As is well known, the CPU is responsible for performing most calculations/instructions, and is often relied on for performing a transfer of data from one memory location to another memory location. In early computer systems, the CPU was responsible not only for the execution of programs, but was also responsible for transferring data to and from various memory locations (e.g., transferring data to and from peripheral devices, etcetera). For instance, the CPU typically operates on data stored in a main memory. Because there are practical size limitations on such main memory, bulk memory storage devices may be provided in addition to and separately from the main memory. When the CPU wants to make use of data stored in such a bulk storage device, such as a hard disk, for example, the data is typically moved from the hard disk into the main memory.

Utilizing the CPU to perform such data transfers is very inefficient because such data transfers prevent the CPU from performing other tasks, thereby hindering the overall efficiency of the computer system. Accordingly, direct memory access (DMA) is commonly utilized to enable computer systems to cut out the "middle man," thereby allowing the CPU to perform other tasks. For example, a DMA chip (or DMA controller) is commonly included in computer systems to enable a peripheral device to effectively transfer data itself, leading to increased performance of the computer system. Prior art DMA systems and methods are well known by those of ordinary skill in the art, and therefore will only briefly be described hereafter.

DMA circuitry generally provides "channels," along with circuitry to control such channels, which allow the transfer of data without the CPU controlling every aspect of the transfer. Such circuitry is commonly part of the system chipset on the motherboard of a personal computer (PC), for example. When a device desires to move a block of data, the DMA controller receives descriptor information from the CPU as to the base location from where bytes are to be moved (i.e., the "source address"), the address to where the bytes should be moved (i.e., the "destination address"), and the number of bytes to move (i.e., the "length" of the block of data). Once it receives such descriptor information, the DMA controller oversees the transfer of the data within the computer system. Once the data move is complete, the DMA controller notifies the CPU of such completion. Normally, DMA operations are used to move data between input/output (I/O) devices and memory.

Turning to FIG. 1, a relatively simple example of a data move operation performed by a DMA is shown. As shown, a computer system 100 includes a first memory location 102 and a second memory location 104. For example, memory location 102 may be included within a hard disk or some other type of peripheral device, and memory location 104 may be the main memory of computer system 100. When a device or an application desires to transfer a block of data from memory location 102 to memory location 104, CPU 114 provides to DMA 106 the necessary descriptor information for identifying the desired transfer. That is, CPU 114 provides descriptor information that includes the source address 108 (i.e., the base address from where bytes are to be moved), the destination address 112 (i.e., the address to where the bytes should be moved), and the length 110 of the block of data to be moved. Based on the received descriptor information, DMA 106 performs the identified data transfer operation from memory location 102 to memory location 104. Once complete, DMA 106 notifies CPU 114 of the completion of the requested data transfer operation.

DMA 106 in FIG. 1 may be referred to as a "simple DMA," in that it performs a data transfer that is identifiable by a single descriptor (e.g., a single source, destination, and length). However, a more complex DMA, which may be referred to as a "chaining DMA" is also available in the prior art. Such a chaining DMA is capable of performing a data transfer of a block of data that is not identifiable by a single descriptor. Turning to FIG. 2, an example of a data move operation that requires multiple descriptors for identification to be performed by a chaining DMA is shown. As shown, a computer system 200 includes a first memory location 202 and a second memory location 204, similar to that of FIG. 1 described above. For example, memory location 202 may be included within a hard disk or some other type of peripheral device, and memory location 204 may be the main memory of computer system 200. A device or application may desire to transfer data, which such device or application logically views as a block 208. That is, data may be treated as a logical "block" 208 by an application and/or device, but such logical block 208 may not actually be a contiguous block within the physical memory. As shown in the example of FIG. 2, logical block 208 is actually divided among three separate memory locations (or sub-blocks) $210_A$, $210_B$, and $210_C$ within first memory location 202. That is, logical block 208 comprises three separate source addresses $210_A$, $210_B$, and $210_C$.

Furthermore, each source address may have a different length. That is, the portion of data block 208 starting at source address $210_A$ may include contiguous data having length $211_A$, the portion of data block 208 starting at source address $210_B$ may include contiguous data having length $211_B$, and the portion of data block 208 starting at source address $210_C$ may include contiguous data having length $211_C$, wherein lengths $211_A$, $211_B$, and $211_C$ may be different. Additionally, each sub-block $210_A$, $210_B$, and $210_C$ must have a different destination address. Otherwise, one sub-block would overwrite all or a portion of another of the sub-blocks. For example, if sub-blocks $210_A$, $210_B$, and $210_C$ were all written to the exact same destination address, the latter sub-blocks to be written to such destination address would overwrite all or a portion (depending on the length of each sub-block) of the earlier written sub-blocks. Thus, multiple descriptors are required to identify the data transfer operation of logical block 208. More specifically, three separate source addresses, three separate destination addresses, and three separate lengths are required to identify the data transfer of block 208 from memory 202 to memory 204.

Accordingly, when a device or an application desires to transfer block 208 from memory location 202 to memory location 204, CPU 214 provides to DMA 206 the multiple descriptors necessary to identify such a data transfer. The multiple descriptors are referred to as being "chained" together because the DMA 206 must complete all of the multiple data transfers before indicating to CPU 214 that the transfer of block 208 is complete. Thus, in the example of FIG. 2, DMA 206 will receive the three chained descriptors and perform the necessary operations to move the data of block 208 from first memory location 202 to second memory location 204.

A "scatter/gather" algorithm is commonly utilized in this situation to cause DMA 206 to move the non-contiguous (or scattered) sub-blocks $210_A$, $210_B$, and $210_C$ from memory location 202 to memory location 204 in a manner that "gathers" the sub-blocks as a contiguous block of memory, shown as 212. Of course, in other data transfers, the opposite may be true. For example, data block 208 may be a contiguous block of data within memory location 202, but may need to be "scattered" into two or more sub-blocks when moved to memory location 204. For instance, memory location 204 may not have a sufficiently large contiguous block of memory available for writing block 208, and therefore may be required to "scatter" block 208 as separate sub-blocks within memory location 204. In either case, multiple descriptors that are "chained" are supplied to DMA 206 to accomplish the data transfer. Once all of the data transfer operations identified by the chained descriptors are complete, DMA 206 notifies CPU 214 of the completion of the requested data transfer of block 208. It should be understood that to the device or application requesting the move of data block 208, the data transfer appears as a single move of data, even though in reality DMA 206 performs multiple moves of non-contiguous sub-blocks of data to accomplish the requested data transfer.

Thus, simple DMAs capable of receiving a single descriptor and performing a data move identified by such descriptor are available in the prior art. Also, "chaining DMAs" are available in the prior art, which are capable of receiving "chained" descriptors and performing data moves identified by such chained descriptors.

Given that the DMA controller may receive more data transfer requests than it can service at one time, descriptors are generally queued in a "descriptor queue," which is generally managed by some type of queue management software. That is, descriptors are held in the descriptor queue (or command queue), and the DMA then services each descriptor (or each data transfer request identified by the descriptors) in turn. Turning to FIG. 3, an example illustrating this point is provided. As shown in FIG. 3, computer system 300 includes multiple "clients" (e.g., devices and/or applications) that may each request a data move to be performed by DMA 306, which may be either a simple DMA or a chaining DMA.

For example, clients A, B, and C are included in computer system 300, each of which may interact with CPU 314 to request data move operations to be performed by DMA 306. Also included in computer system 300 is queue management software (which may be referred to as a "driver") 308. Queue management software 308 receives requests for data move operations from CPU 314, wherein such requests include descriptor(s) for identifying a desired data move operation, and queue management software 308 queues such requests in descriptor queue (or command queue) 310. Queue management software 308 then supplies each descriptor, in turn, to DMA 306, which performs each desired data move.

Suppose, for instance, that client A first requests a data move operation, while DMA 306 is busy performing a previously received data move request. CPU 314 communicates the request (i.e., the descriptor) from client A to queue management software 308, which queues the request, shown as request $312_A$, in descriptor queue 310. Thereafter, client B requests a data move operation. CPU 314 communicates the descriptor information to queue management software 308, which queues the request $312_B$ in descriptor queue 310. Client A then requests another data move operation, which queue management software 308 queues as request $312_C$ in descriptor queue 310, and thereafter, client C requests a data move operation, which queue management software 308 queues as request $312_D$ in descriptor queue 310. When DMA 306 completes a data move request it notifies queue management software 308, which in turn notifies CPU 314 of such completion, and queue management software 308 then sends the next pending descriptor from queue 310 to DMA 306.

Oftentimes a device may have associated with it a buffer or queue for the actual data that it transmits to another location and/or receives from another location. Such a queue (or buffer) may be quite limited in size. That is, the data queue associated with a particular device may only be able to store a relatively small amount of data. Accordingly, in the prior art, queue management software (which may be referred to herein as a driver) is typically utilized to manage the data within a device's data queue. For example, to efficiently utilize the limited amount of memory available in a device's data queue, such data queue may be implemented as a circular queue. Turning to FIG. 4, an exemplary logical diagram of a circular data queue 400 is provided. As shown, data queue management software typically utilizes a "head" pointer 402, which indicates the beginning of the data stored in circular queue 400, and data queue management software typically utilizes a "tail" pointer 404, which indicates the end of the data stored in circular queue 400. For example, a first block of data 406 is stored in circular queue 400, followed by a second block of data 408, and then a third block of data 410. Tail pointer 404 indicates the location at which a new block of data is to be added to circular queue 400. Thus, if data is to be added to circular queue 400, the queue management software utilizes tail pointer 404 to indicate the proper location for such data to be added within circular queue 400. Additionally, if block 406 is transferred to another memory location, then the queue management software moves head pointer 402 to correspond to the beginning of data block 408. Thus, the queue management software continually updates the head and tail pointers as data is transferred to/from queue 400. Such circular queue management technique is well known in the prior art.

SUMMARY OF THE INVENTION

A general desire exists for a system and method for efficient data transfer management. As described in greater detail hereafter, prior art DMA implementations typically require that queue management software (or a driver) remember a requested data transfer transaction during performance of such data transfer by the DMA, and upon completion of a data transfer by the DMA, the queue management software updates records (or "directories") of data queues associated with the source and/or destination. Such an implementation that requires the queue management software to remember a requested transaction and update data source records to reflect the data transfer upon completion of such data transfer by the DMA is inefficient. Thus, a desire exists for an efficient data transfer management system and method that do not require queue management software to remember a requested transaction and update the records (or "directories") of data queues after such transaction is completed by the DMA. Accordingly, a desire exists for an enhanced DMA, which is capable of not only performing one or more requested data transfer operations, but is also capable of updating one or more data queue directories as needed to properly reflect such data transfer operations.

Accordingly, the present invention is directed to a system and method which utilize an enhanced DMA to both perform a desired data transfer and update data queue directories as needed to properly reflect such data transfer. In a preferred embodiment, such an enhanced DMA is implemented to receive a data transfer request, and in response, performs the desired data transfer and updates one or more data queue directories to properly reflect such data transfer within the data queue directories. More specifically, in a preferred embodiment, the enhanced DMA is implemented to receive a data transfer request, which comprises at least one data transfer descriptor, which indicates the desired data transfer, and at least one record update descriptor, which indicates one or more data queue directories needing to be updated to properly reflect the desired data transfer.

Once the enhanced DMA performs the desired data transfer and necessary data queue directory updates, it notifies the requesting driver that the desired data transfer operation is complete. Because the enhanced DMA performs the necessary data queue directory updates, the requesting driver is not required to remember a requested data transfer operation and perform the data queue directory updates after receiving a completion notice from the enhanced DMA. Instead, once the requesting driver receives a completion notice from the enhanced DMA, the data transfer operation is fully completed, including any necessary data queue directory updates. Thus, no additional "clean-up" work is required to be performed by the requesting driver after receiving completion notice from the enhanced DMA. As a result, the data transfer management of a preferred embodiment is much more efficient than typical data transfer management of the prior art, wherein a requesting driver is required to perform "clean-up" (e.g., updating data queue directories to properly reflect a data transfer operation performed by the DMA) after receiving a completion notice from the DMA. Additionally, a preferred embodiment may enable a requesting driver to have a less complex implementation than is typically required in the prior art. For instance, requesting drivers of the prior art are typically required to "remember" a requested data transfer operation, and update data queue directories to reflect the requested data transfer after receiving notice from the DMA that the requested data transfer has been performed. However, in a preferred embodiment, a requesting driver is not required to "remember" a requested data transfer operation or update data queue directories to reflect the requested data transfer operation, as the enhanced DMA performs both the data transfer and the necessary data queue directory updates. Thus, a preferred embodiment may enable a less complex requesting driver to be implemented.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 shows an example of multiple requests being queued for service by a DMA of the prior art;

FIG. 4 shows an exemplary logical diagram of a circular data queue of the prior art, FIG. 5 shows an exemplary computer system that illustrates an example of typical data transfer management of the prior art;

FIG. 9 shows a further example of data transfer management according to a preferred embodiment of the present invention, wherein data is transferred from a first DSP to a second DSP;

FIG. 10 shows an exemplary operational flow diagram of queue management operations of a preferred embodiment of the present invention, FIG. 11 shows an exemplary operational flow diagram of a data transfer transaction according to a preferred embodiment, and FIGS. 12A–12C show an exemplary operational flow diagram of the state manager for the enhanced DMA of a preferred embodiment.

DETAILED DESCRIPTION

Figure 1:
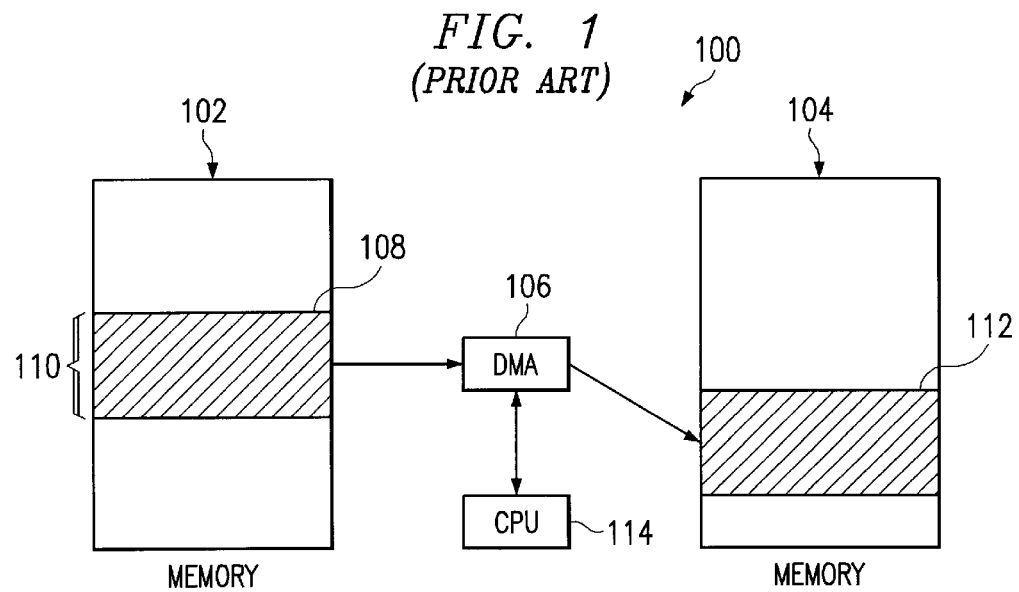
FIG. 1 shows an example of a data move operation performed by a simple DMA of the prior art.
Figure 2:
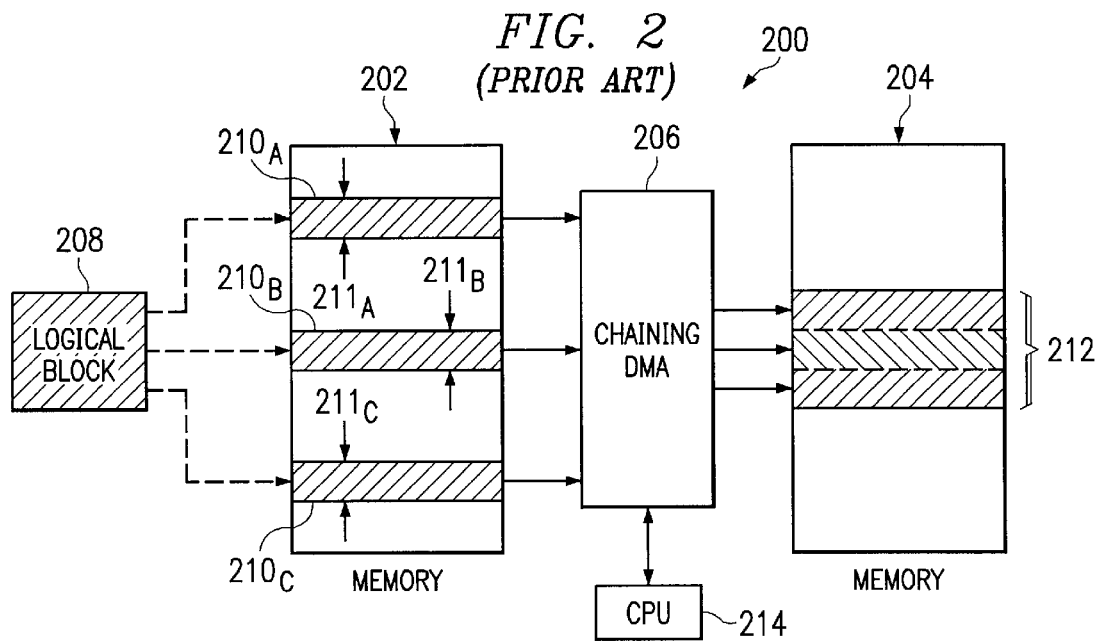
FIG. 2 shows an example of a data move operation in which multiple descriptors are required for identification of the data move operation to be performed by a chaining DMA of the prior art.

To aid in the reader's understanding of the present invention, it is proper to first describe typical data transfer management implementations of the prior art. Typical data transfer management of the prior art can be better understood with reference to the example provided in FIG. 5. FIG. 5 provides an exemplary computer system 500 that includes queue management software 508, which receives and queues in descriptor queue 510 data transfer requests for DMA 506. As shown, a client (e.g., "client B") has requested a data transfer. CPU 514 communicated such request to queue management software 508, which queued the request 512 for client B in descriptor queue 510. Request 512 comprises a descriptor, such as (source=1000, length=50, destination=300), for example. Thus, request 512 desires 50 bytes of data to be moved from the source address 1000 to the destination address 300. When DNA 506 is available to service this request, queue management software 508 provides the descriptor from request 512 to DMA 506. DMA 506 then performs the move of the indicated block of data from the source memory location 502 to the destination memory location 504. More specifically, DMA 506 moves the 50 byte block of data from source address 1000 to the destination address 300.

In the example of FIG. 5, both source memory location 502 and destination memory location 504 are implemented as circular data queues. Accordingly, the queue management software (or "driver") 508 maintains a "context" or record (which may also be referred to as a directory) of such circular queues 502 and 504 indicating the head and tail of such queues. For example, queue management record $502_R$ is maintained for source memory location 502, which indicates the address of the head of data queue 502, as well as the address of the tail of data queue 502. Likewise, queue management record $504_R$ is maintained for destination memory location 504, which indicates the address of the head of data queue 504, as well as the address of the tail of data queue 504. When DMA 506 completes the data move requested by request 512, it notifies queue management software 508, which must then update the records (or contexts) of the source and destination data queues (i.e., records $502_R$ and $504_R$) For example, once the 50 bytes of data are moved from source data queue 502 to destination data queue 504, queue management software 508 must update records $502_R$ and $504_R$. More specifically, queue management software 508 must update source record $502_R$ to properly indicate that the new head of data queue 502 is address 1050, rather than address 1000. Similarly, queue management software 508 must update destination record $504_R$ to properly indicate that the new tail of data queue 504 is address 350, rather than address 300 (because 50 bytes of data have been added from source 502 to the previous tail address 300). Once queue management software 508 has updated records $502_R$ and $504_R$, it notifies CPU 514 that the requested data transfer is complete.

Management of data transfer operations in the prior art is inefficient because, as described above, it requires queue management software to remember a requested transaction and update the context (or records) of data queues after such transaction is completed by the DMA. Prior art DMAs (both simple and chaining) fail to update the contexts or records, which are utilized, for example, in the management of circular data queues, thus requiring data management software to remember a requested transaction and update such contexts upon completion of the transaction by the DMA to accurately reflect the new contexts of the data queues. Thus, after scheduling a data transfer operation with the DMA, the queue management software (or driver) must remember the scheduled transfer and update the circular queue directory (e.g., head and/or tail pointers) once the DMA completes the data transfer operation.

Figure 6:
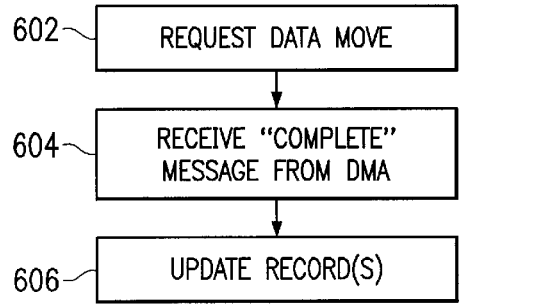
FIG. 6 shows an exemplary operational flow diagram of traditional queue management operations of the prior art.

Turning to FIG. 6, an exemplary operational flow diagram 600 of traditional queue management operations of the prior art is shown. As shown and as is described above, in performing a data transfer operation utilizing a prior art DMA, a driver (or queue management software) first requests the desired data move by communicating the proper descriptor(s) to the DMA, at block 602. Thereafter, the driver waits for the DMA to complete the requested move, and while waiting, the driver must remember the transaction (i.e., data move) that it requested. At block 604, the driver receives notification from the DMA that the requested data transfer has been completed. Thereafter, at block 606, the driver updates the context(s) (or records) of the data queue by, for example, updating the head and tail pointers to correspond with the appropriate addresses within the data queue. As described above, the driver may be required to update the context for both a source data queue and a destination data queue.

Figure 7:
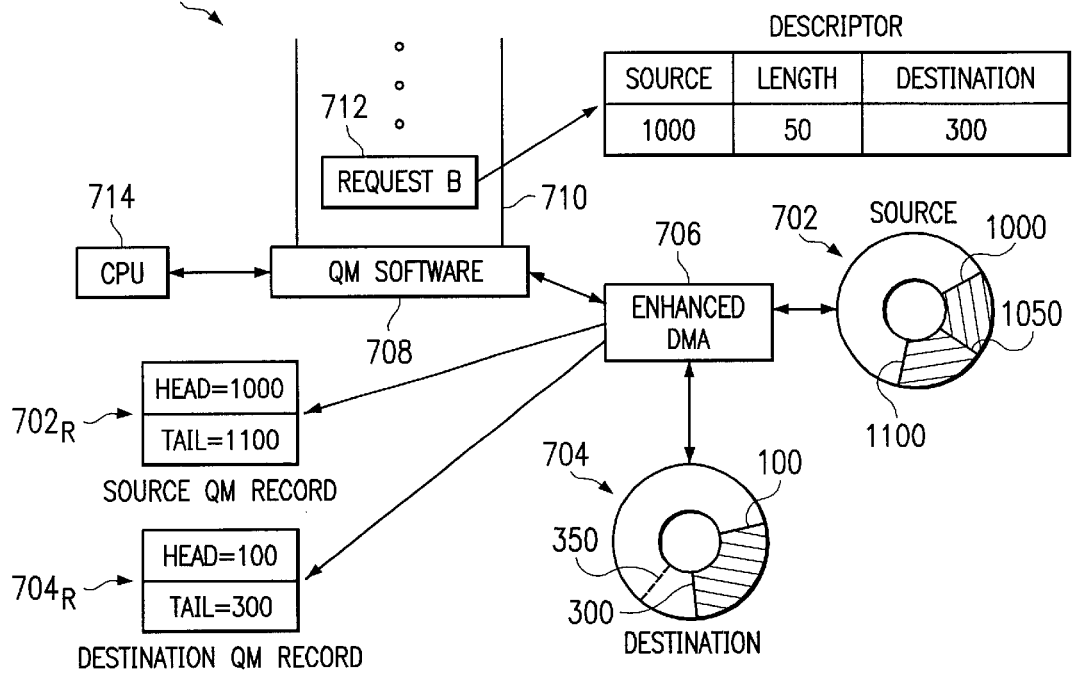
FIG. 7 shows an example of data transfer management according to a preferred embodiment of the present invention, which utilizes an enhanced DMA of a preferred embodiment.

Turning to FIG. 7, an example of data transfer management according to a preferred embodiment of the present invention is shown. FIG. 7 provides an exemplary computer system 700 that includes queue management software (or a "driver") 708, which receives data transfer requests and queues such requests in descriptor queue 710 for "enhanced" DMA 706. As shown, a client (e.g., "client B") has requested a data transfer. CPU 714 communicated such request to queue management software 708, which queued the request 712 for client B in descriptor queue 710. Request 712 comprises a descriptor, such as (source=1000, length=50, destination=300), for example. Thus, in the example of FIG. 7, request 712 desires 50 bytes of data to be moved from the source address 1000 to the destination address 300, just as was described in the example of prior art data transfer management shown in FIG. 5. When enhanced DMA 706 is available to service this request, queue management software 708 provides the descriptor from request 712 to enhanced DMA 706. Enhanced DMA 706 then performs the move of the indicated block of data from the source memory location 702 to the destination memory location 704. More specifically, enhanced DMA 706 moves the 50 byte block of data from source address 1000 to the destination address 300.

As in the example of FIG. 5, in this example, both source memory location 702 and destination memory location 704 are implemented as circular data queues. Accordingly, a "context" or record (which may also be referred to as a directory) is maintained for such circular queues 702 and 704 indicating the head and tail of such queues. For example, queue management record $702_R$ is maintained for source memory location 702, which indicates the address of the head of data queue 702, as well as the address of the tail of data queue 702. Likewise, queue management record $704_R$ is maintained for destination memory location 704, which indicates the address of the head of data queue 704, as well as the address of the tail of data queue 704. As shown in FIG. 7, in a preferred embodiment, enhanced DMA 706 updates the records (or contexts) of the source and destination data queues (i.e., records $702_R$ and $704_R$). For example, once the 50 bytes of data are moved from source data queue 702 to destination data queue 704, enhanced DMA 706 updates records $702_R$ and $704_R$. More specifically, enhanced DMA 706 updates source record $702_R$ to properly indicate the new head of data queue 702 (e.g., as being address 1050, rather than address 1000). Similarly, enhanced DMA 706 updates destination record $704_R$ to properly indicate the new tail of data queue 704 (e.g., as being address 350, rather than address 300). Thus, unlike prior art management schemes, driver 708 is not required to remember a requested transaction and update the data queue records upon completion of a data transfer by the DMA. Instead, in a preferred embodiment, enhanced DMA 706 allows driver 708 to schedule a data transfer and completely "forget" the scheduled job's context. After the scheduled data transfer is complete, driver 708 may immediately schedule a new data transfer, rather than first being required to update the data queue contexts.

Having enhanced DMA 706 update data queue records $702_R$ and $704_R$ to reflect the data transfer greatly improves the efficiency of the data transfer management. For example, initial calculations indicate that having enhanced DMA 706 update the data queue records, rather than having driver 708 remember the requested data transfer and update such data queue records upon completion of the data transfer, increases the efficiency of the data transfer management by approximately ten to twenty percent. That is, the entire data transfer operation, including the update of data queue records as needed, may be completed much faster than in prior art schemes (e.g., with a ten to twenty percent decrease in time required for completion).

Figure 8:
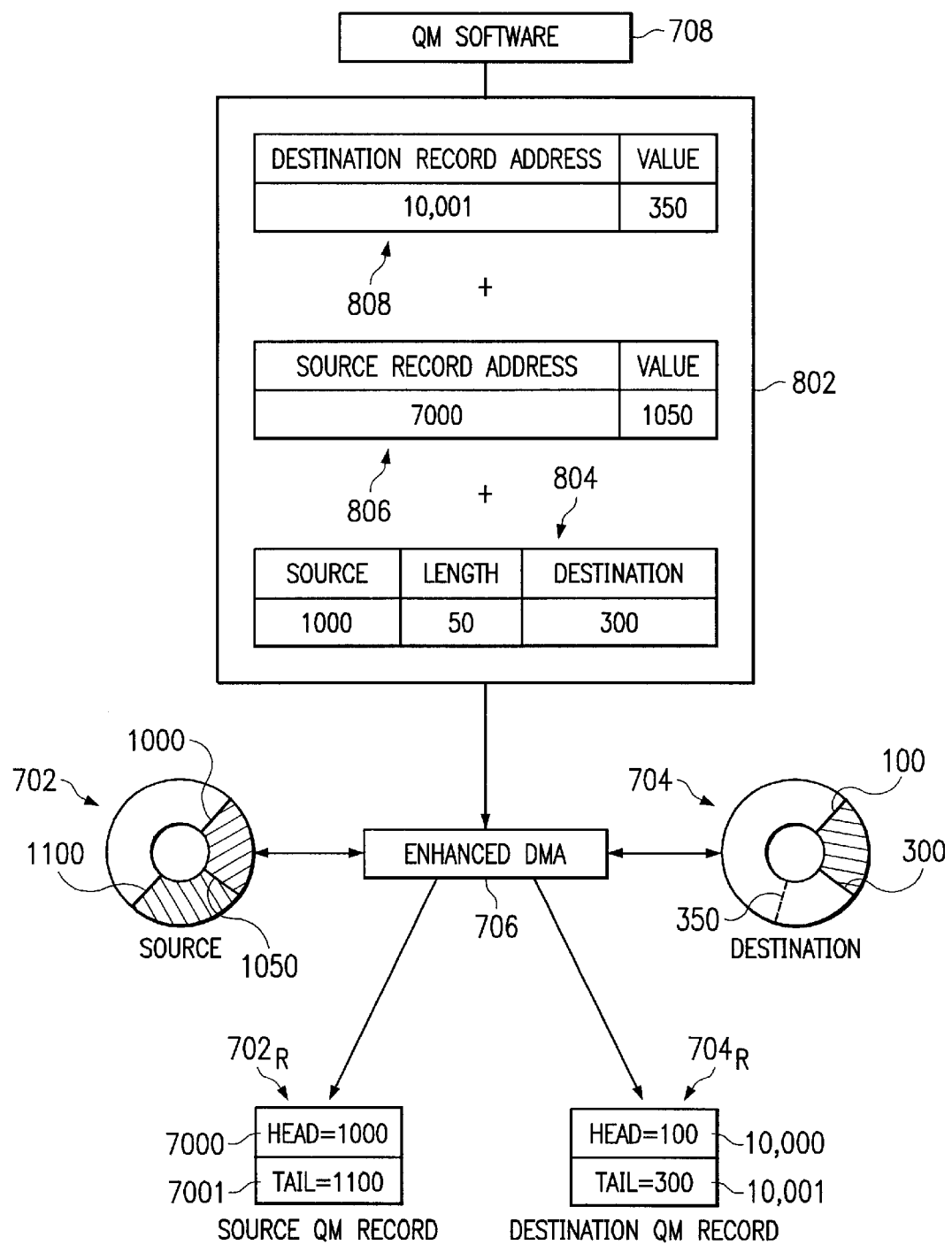
FIG. 8 shows the exemplary data transfer management of FIG. 7 in greater detail.

Turning to FIG. 8, a preferred embodiment of the present invention is shown in greater detail. FIG. 8 further illustrates the exemplary data transfer operation discussed above in FIG. 7. Thus, a client requests to have 50 bytes of data moved from source address 1000 (of source memory location 702) to destination address 300 (of destination memory location 704). In a preferred embodiment, driver 708 schedules the desired data transfer with enhanced DMA 706 by communicating request 802 to enhanced DMA 706. Preferably, request 802 includes one or more data transfer descriptor(s) 804, which indicates the data transfer operation to be performed. As with prior art DMA, data transfer descriptor 804 preferably indicates the source address from which data is to be moved (e.g., address 1000), the length of the data to be moved (e.g., 50 bytes), and the destination address to which the data is to be moved (e.g., 300). As also described above for prior art DMA, multiple data transfer descriptors may be "chained" together to fully describe the desired data transfer operation to be performed by enhanced DMA 706.

In a preferred embodiment, request 802 further includes one or more data queue record descriptors (which may be referred to as "record update descriptors"). In the example of FIG. 8, request 802 includes a "source record update descriptor" 806 and a "destination record update descriptor" 808. Such record update descriptors indicate the address of the data queue's record to be updated and the value with which such address is to be updated in order to reflect the data transfer operation identified by data transfer descriptor 804. For instance, in the example of FIG. 8, source record 702$_R$ includes a "head" value (or pointer) at address 7000 and "tail" value (or pointer) at address 7001. As described above, the value of the head pointer indicates the address of the head (or start) of the data contained in source data queue 702, and the value of the tail pointer indicates the address of the tail (or end) of the data contained in source data queue 702. Similarly, destination record 704$_R$ includes a "head" value (or pointer) at address 10,000 and "tail" value (or pointer) at address 10,001. As described above, the value of the head pointer indicates the address of the head (or start) of the data contained in destination data queue 704, and the value of the tail pointer indicates the address of the tail (or end) of the data contained in destination data queue 704.

Source record update descriptor 806 identifies the address of the head pointer of source record 702$_R$ (i.e., 7000 in the example of FIG. 8). Source record update descriptor 806 further identifies the value to be written to the head pointer's address in order to accurately reflect the data transfer operation. More specifically, in the example of FIG. 8, source record update descriptor 806 instructs enhanced DMA 706 to write value 1050 to address 7000. It can be seen from FIG. 8 that once 50 bytes of data is moved from source address 1000 to destination address 300, as requested by data transfer descriptor 804, the head pointer of source data queue 702 then becomes 1050. Accordingly, source record update descriptor 806 instructs enhanced DMA 706 to write the value 1050 to address 7000, which is the address for the head pointer of source record 702$_R$.

Similarly, destination record update descriptor 808 identifies the address of the tail pointer of destination record 704$_R$ (i.e., 10,001 in the example of FIG. 8). Destination record update descriptor 808 further identifies the value to be written to the tail pointer's address in order to accurately reflect the data transfer operation. More specifically, in the example of FIG. 8, destination record update descriptor 808 instructs enhanced DMA 706 to write value 350 to address 10,001. It can be seen from FIG. 8 that once 50 bytes of data is moved from source address 1000 to destination address 300, as requested by data transfer descriptor 804, the tail pointer of destination data queue 704 then becomes 350. Accordingly, destination record update descriptor 808 instructs enhanced DMA 706 to write the value 350 to address 10,001, which is the address for the tail pointer of destination record 704$_R$.

As a result, when enhanced DMA 706 notifies driver 708 that the requested transaction is complete, no additional action is required by driver 708 (i.e., the requested transaction is fully complete). Thus, enhanced DMA 706 of a preferred embodiment is capable of performing a requested data transfer and updating the data queue records as needed. The data transfer descriptor(s) and record update descriptor(s) received by enhanced DMA 706 may be treated much like "chained" descriptors, wherein enhanced DMA 706 performs all of the transactions identified by such descriptors and then returns notification that the requested data transfer is complete. For example, upon receiving request 802, enhanced DMA 706 will perform the data transfer identified by data transfer descriptor 804, update records 702$_R$ and 704$_R$ as indicated by record update descriptors 806 and 808, and then return notification that request 802 has been completed.

FIG. 9 shows a further example of data transfer management according to a preferred embodiment of the present invention. FIG. 9 provides two digital signal processors (DSPs), shown as DSP A and DSP B Each DSP has a transmit queue (or buffer) and a receive queue (or buffer) associated therewith. More specifically, DSP A has transmit queue 902 and receive queue 903 associated with it, and DSP B has receive queue 904 and transmit queue 905 associated with it. Suppose, for example, that a client desires to transfer a block of data from DSP A to DSP B. More specifically, suppose that a client desires to transfer 50 bytes of data from address 500 of DSP A's transmit queue 902 (i.e., the source memory location) to address 2800 of DSP B's receive queue 904 (i.e., the destination memory location). To perform such a data transfer, CPU 908 communicates a request 910 to enhanced DMA 906. Request 910 includes data transfer descriptor 912, which identifies the request to transfer 50 bytes (length) of data from address 500 (source) to address 2800 (destination). Of course, data transfer descriptor 912 may comprise two or more descriptors "chained" together to identify the desired data transfer operation.

Request 910 also includes record update descriptors (or "queue directory update descriptors") 914 and 916, which instruct enhanced DMA 906 to update the appropriate records (or directories) to reflect the desired data transfer operation. More specifically, such record update descriptors indicate the address of the data queue's record (or directory) to be updated and the value with which such address is to be updated in order to reflect the data transfer operation identified by data transfer descriptor 912. For instance, in the example of FIG. 9, a source record 902$_R$ is maintained, which indicates the address of the head and the address of the tail of transmit queue 902. For instance, source record 902$_R$ includes a "head" value (or pointer) at address 7000 and "tail" value (or pointer) at address 7001 As described above, the value of the head pointer indicates the address of the head (or start) of the data contained in transmit queue 902, and the value of the tail pointer indicates the address of the tail (or end) of the data contained in transmit queue 902. Similarly, a destination record 904$_R$ is maintained, which indicates the address of the head and the address of the tail of receive queue 904. For instance, destination record 904$_R$ includes a "head" value (or pointer) at address 9000 and "tail" value (or pointer) at address 9001. As described above, the value of the head pointer indicates the address of the head (or start) of the data contained in receive queue 904, and the value of the tail pointer indicates the address of the tail (or end) of the data contained in receive queue 904.

Record update descriptor 914 ("source record update descriptor") identifies the address of the head pointer of source record (or "transmit record") 902$_R$ (i.e., 7000 in the example of FIG. 9). Source record update descriptor 914 further identifies the value to be written to the head pointer's address in order to accurately reflect the data transfer operation. More specifically, in the example of FIG. 9, source record update descriptor 914 instructs enhanced DMA 906 to write value 550 to address 7000. It can be seen from FIG. 9 that once 50 bytes of data is moved from source address 500 to destination address 2800, as requested by data transfer descriptor 912, the head pointer of source data queue 902 then becomes 550. Accordingly, source record update descriptor 914 instructs enhanced DMA 906 to write the value 550 to address 7000, which is the address for the head pointer of source record $902_R$. Thus, once the data transfer operation is performed, the head and tail of transmit queue 902 have the same value (i.e., 550), indicating that transmit queue 902 is empty.

Similarly, record update descriptor 916 ("destination record update descriptor") identifies the address of the tail pointer of destination record (or "receive record") $904_R$ (i.e., 9001 in the example of FIG. 9). Destination record update descriptor 916 further identifies the value to be written to the tail pointer's address in order to accurately reflect the data transfer operation. More specifically, in the example of FIG. 9, destination record update descriptor 916 instructs enhanced DMA 906 to write value 2850 to address 9001. It can be seen from FIG. 9 that once 50 bytes of data is moved from source address 500 to destination address 2800, as requested by data transfer descriptor 912, the tail pointer of destination data queue 904 then becomes 2850. Accordingly, destination record update descriptor 916 instructs enhanced DMA 906 to write the value 2850 to address 9001, which is the address for the tail pointer of destination record $904_R$.

As described above, a preferred embodiment enables much more efficient data transfer than was typically available in the prior art. Turning now to FIG. 10, an exemplary operational flow diagram 1000 of queue management operations of a preferred embodiment is shown. As shown and as is described above, in performing a data transfer operation utilizing the enhanced DMA of a preferred embodiment, a driver (or queue management software) first requests the desired data move and necessary record updates by communicating the proper data transfer descriptor(s) and record update descriptor(s) to the enhanced DMA, at block 1002. Thereafter, the driver waits for the enhanced DMA to complete the requested data move and record update. However, while waiting, the driver is not required to remember the transaction (i.e., data move) that it requested because the enhanced DMA performs the necessary record updates. At block 1004, the driver receives notification from the enhanced DMA that the requested data transfer and any necessary record updates have been completed. Thus, upon receiving such notification of completion from the enhanced DMA, no additional action is required to be performed by the driver, such as updating records. Instead, the next desired data transfer operation may immediately be scheduled with the enhanced DMA. As compared with the traditional queue management scheme of the prior art described in conjunction with FIG. 6, the queue management scheme of a preferred embodiment is much more simplified and efficient. For example, the driver of a preferred embodiment may be greatly simplified over that commonly implemented in the prior art because, for instance, the driver is not required to "remember" a requested data transfer in order to update the queue records to reflect the data transfer.

Turning to FIG. 11, an exemplary operational flow diagram 1100 of a data transfer transaction is shown in greater detail. As shown, at block 1102, client A may request a data transfer to client B. For example, DSP A of FIG. 9 may request a transfer of data from its transmit queue to the receive queue of DSP B. At block 1104, the processor (CPU) reads client A's queue directory (or record) in order to determine its head address. Continuing with the above example of FIG. 9, the processor would read DSP A's queue directory $902_R$ to determine that the head address of transmit queue 902 is 500. At block 1106, the processor reads the Inter Processor Communications ("IPC") header at the determined head address to determine the destination ID and length of the data to be transferred. That is, in a preferred embodiment, an IPC header is associated with the head of the source queue (e.g., transmit queue 902), which provides the destination ID of where the data block is to be transferred and the length of the data block.

At block 1108, the processor reads client B's queue directory in order to determine its tail address. Continuing with the above example of FIG. 9, the processor would read DSP B's queue directory $904_R$ to determine that the tail address of receive queue 904 is 9001. Additionally, the processor ensures that sufficient memory is available in destination queue 904 to receive the data block desired to be transferred. If sufficient memory is not available, then the data transfer operation will be required to wait until sufficient memory becomes available in the destination queue, for example. At block 1110, the processor programs the enhanced DMA to perform the desired data transfer and any queue record (or directory) updates necessary to properly reflect the data transfer. Continuing with the above example of FIG. 9, the processor sends request 910 to enhanced DMA 906, thereby programming enhanced DMA 906 to perform the appropriate data transfer and record updates that are indicated by data transfer descriptor 912 and record update descriptors 914 and 916. At block 1112, the enhanced DMA performs the requested data transfer and needed queue directory updates, and at block 1114, the enhanced DMA returns notification of completion of the requested transaction to the processor.

To implement the enhanced DMA of a preferred embodiment, the operation of the DMA controller's state manager is modified from that of the prior art. An exemplary operational flow diagram of the state manager, which may, for example, be implemented as firmware (which may include software executing on a programmable logic unit within the DMA, for instance) within the enhanced DMA of a preferred embodiment is shown in FIGS. 12A–12C. Turning to FIG. 12A, the enhanced DMA's operational state begins as "idle" at block 1202. In this exemplary implementation, variable "Start_XFER" is a logical variable that may be true (shown without a bar over the variable) or false (indicated by a bar over the variable). Such Start_XFER variable is true upon the DMA receiving a request to perform a data transfer operation. Similarly, variable "Stop_XFER" is a logical variable that is implemented, which may be true or false. Such Stop_XFER variable is true upon some operation causing a requested transfer of data to be stopped. As shown in FIG. 12A, the operational state remains at idle 1202 as long as variable Start_FER is false or variable Stop_XFER is true.

Upon Start_XFER becoming true and Stop_XFER becoming false (thereby indicating that a data transfer has been requested and has not been requested to stop), the operational state advances to block 1204. For instance, referring to the example of FIG. 9, upon enhanced DMA 906 receiving a request for data transfer 910 from CPU 908, the enhanced DMA's operational state advances from idle to block 1204. At operational block 1204, the enhanced DMA initializes the source device for the requested data transfer operation. For example, the enhanced DMA instructs the source device to set its pointer to the beginning address of the data to be transferred, as identified by the data transfer descriptor received by the enhanced DMA. For instance, continuing with the example of FIG. 9, the enhanced DMA would instruct the source device DSP A to set its pointer in its data transmit queue 902 to the source address 500. In this manner, the DMA instructs the source device to set its pointer to the address from which it is to transfer data when instructed by the DMA.

Thereafter, operation advances to block 1206 at which the enhanced DMA initializes the destination device for the requested data transfer operation. For example, the enhanced DMA instructs the destination device to set its pointer to the address at which the data is to be transferred, as identified by the data transfer descriptor received by the enhanced DMA. For instance, continuing with the example of FIG. 9, the enhanced DMA would instruct the destination device DSP B to set its pointer in its data receive queue 904 to the destination address 2800. In this manner, the DMA instructs the destination device to set its pointer to the address to which data is to be transferred when instructed by the DMA.

Once the source and destination devices are initialized for the data transfer, the enhanced DMA transfers the data between such source and destination devices in operational block 1208, as requested by the data transfer descriptor. Such transfer continues until the entire length of the requested data transfer has been completed (i.e., until source_length=0). For instance, again referring to FIG. 9, because the length of the data requested to be transferred is 50 bytes, variable source_length is set equal to 50, and such variable is decremented as each byte is transferred from the source device to the destination device. Once the requested data transfer has been completed (i.e., source_length=0), operation advances to block 1210. At block 1210, the enhanced DMA decrements a counter of the number of data transfer descriptors received in a request. For instance, as described above, enhanced DMA may operate as a chaining DMA in that it receives multiple data transfer descriptors to be performed to satisfy a request. If the data transfer descriptor_counter is greater than 0 (indicating that additional data transfer descriptors were received and need to be performed) and the Stop_XFER variable is false, then operation advances back to block 1204 to transfer the data as requested in such additional data transfer descriptor.

Once the data transfer(s) requested by all of the received data transfer descriptors has been completed (i.e., Descriptor_Counter=0), operation of the enhanced DMA of a preferred embodiment advances to the operational steps shown in FIG. 12B (as indicated by carryover block 1212). It should be recognized that the above-described operational flow of FIG. 12A is generally consistent with the operation of typical DMAs of the prior art. However, once the requested data transfer is performed by the enhanced DMA of a preferred embodiment of the present invention, its operation advances to perform the operations further described herein in conjunction with FIGS. 12B and 12C, which are not available in prior art DMAs.

Turning to FIG. 12B, operation logically carries over from FIG. 12A via block 1212 and advances to operational block 1216, whereat the enhanced DMA determines whether a source record update descriptor was received within a request. For instance, again referring to the example of FIG. 9, request 910 received by the enhanced DMA may include a source record update descriptor 914. A preferred embodiment provides flexibility to enable the DMA to be utilized as a standard chaining DMA by not including such a source record update descriptor within a request, but by including the source record update descriptor enhanced performance may be recognized as described above. If it is determined at block 1216 that a received request does include a source record update descriptor (causing the Source_Update variable to be true), operation advances to block 1218. At block 1218, the enhanced DMA instructs the source device to set its pointer to update its record to reflect the data transfer operation that was performed in the operational steps of FIG. 12A. More specifically, the enhanced DMA instructs the source device to set its pointer to the source record address storing the value of the head pointer of the data transmit queue as provided in the received source record update descriptor (e.g., address 7000 in the example of FIG. 9). Then at block 1220, the enhanced DMA transfers the appropriate value to the source record address in order to reflect the data transfer that was performed. For instance, in the example of FIG. 9, the value 550 would be transferred to the source device's record address 7000 to update the head of its data queue to point to address 550.

Once the source record is updated in block 1220 or if it is determined in block 1216 that no source record update descriptor was received in the request (causing variable Source_Update to be false), operation advances to block 1226. At block 1226, the enhanced DMA determines whether a destination record update descriptor was received within a request. For instance, again referring to the example of FIG. 9, request 910 received by the enhanced DMA may include a destination record update descriptor 916. A preferred embodiment provides flexibility to enable the DMA to be utilized as a standard chaining DMA by not including such a destination record update descriptor within a request, but by including the destination record update descriptor enhanced performance may be recognized as described above. If it is determined at block 1226 that a received request does include a destination record update descriptor (causing the Destination_Update variable to be true), operation advances to the steps shown in FIG. 12C (indicated by carryover block 1230).

Turning to FIG. 12C, operation logically carries over from FIG. 12B via block 1230 and advances to operational block 1234, whereat the enhanced DMA instructs the destination device to set its pointer to update its record to reflect the data transfer operation that was performed in the operational steps of FIG. 12A. More specifically, the enhanced DMA instructs the destination device to set its pointer to the destination record address storing the value of the tail pointer of the data transmit queue as provided in the received destination record update descriptor (e.g., address 9001 in the example of FIG. 9). Then at block 1236, the enhanced DMA transfers the appropriate value to the destination record address in order to reflect the data transfer that was performed. For instance, in the example of FIG. 9, the value 2850 would be transferred to the destination device's record address 9001 to update the tail of its data queue to point to address 2850.

Once the destination record is updated in block 1236, operation advances to block 1238, whereat the operational state of the enhanced DMA returns to its idle state (i.e., returns to block 1202 of FIG. 12A). Alternatively, if it is determined in block 1226 (of FIG. 12B) that no destination record update descriptor was received in the request (causing variable Destination_Update to be false), operation advances to block 1228, whereat the operational state of the enhanced DMA returns to its idle state (i.e., returns to block 1202 of FIG. 12A). Upon returning to its idle state, the Stop_XFER variable is made true, and the enhanced DMA remains in such idle state 1202 until a new data transfer request is received.

It should be understood that the operational flow diagrams of FIGS. 11 and 12A–12C are intended only as examples, and one of ordinary skill in the art will recognize that in alternative embodiments the order of operation for the various blocks may be varied, certain blocks of operation may be omitted completely, and additional operational blocks may be added. Thus, the present invention is not intended to be limited only to the operational flow diagrams of FIGS. 11 and 12A–12C for data transfer management utilizing an enhanced DMA, but rather such operational flow diagrams are intended solely as examples that render the disclosure enabling for many other operational flow diagrams for implementing such data transfer management/enhanced DMA.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of data transfer management comprising:
   receiving at least one data transfer descriptor at a direct memory access controller;
   receiving at least one record update descriptor at said direct memory access controller;
   said direct memory access controller performing at least one data transfer as instructed by said at least one data transfer descriptor; and
   said direct memory access controller performing at least one record update as instructed by said at least one record update descriptor.

2. The method of claim 1 wherein said performing at least one record update includes updating, to reflect said at least one data transfer, at least one record associated with at least one of:
   a source device from which data is transferred in performing said at least one data transfer, and
   a destination device to which data is transferred in performing said at least one data transfer.

3. The method of claim 2 wherein said performing at least one record update includes updating both a record associated with said source device and a record associated with said destination device to reflect said at least one data transfer.

4. The method of claim 2 wherein said performing at least one record update includes updating a pointer for indicating the end address of data associated with said destination device to reflect said at least one data transfer.

5. The method of claim 1 further comprising:
   said direct memory access controller performing multiple data transfers as instructed by multiple data transfer descriptors received by said direct memory access controller.

6. The method of claim 1 wherein said at least one data transfer descriptor includes:
   identification of source address from which data is to be transferred;
   identification of length of said data to be transferred; and
   identification of destination address to which said data is to be transferred.

7. The method of claim 1 wherein said at least one data transfer transfers data from a memory address associated with a source device to a memory address associated with a destination device.

8. The method of claim 7 wherein said memory address associated with a source device includes memory address associated with one device selected from the group consisting of:
   peripheral device, data input device, data output device, hard disk, and digital signal processor.

9. The method of claim 7 wherein said memory address associated with a destination device includes memory address associated with one device selected from the group consisting of:
   main memory and digital signal processor.

10. The method of claim 1 further comprising:
    notifying a processor of completion of the requested data transfer, wherein queue management software is not required to maintain context of a requested data transfer while such requested data transfer is being performed by said direct memory access controller and wherein said queue management software is not required to perform said at feast one record update to reflect the data transfer.

11. The method of claim 1 further comprising:
    utilizing queue management software for queuing data transfer requests for said direct memory access controller.

12. The method of claim 11 wherein upon issuing a queued data transfer request to said direct memory access controller, said queue management software is not required to perform said at least one record update.

13. The method of claim 1 wherein said at least one record update descriptor includes a source record update descriptor that comprises a source record address and a value to be written to said source record address to reflect performance of said at least one data transfer.

14. The method of claim 1 wherein said at least one record update descriptor includes a destination record update descriptor that comprises a destination record address and a value to be written to said destination record address to reflect performance of said at least one data transfer.

15. The method of claim 1 wherein said at least one record update descriptor includes both a source record update descriptor and a destination record update descriptor.

16. A system for transferring data from a first location to a second location, said system comprising:
    enhanced DMA operable to perform at least one data transfer operation and update at least one data queue directory to reflect said at least one data transfer operation;
    at least one data queue directory wherein said at least one data queue directory includes a destination data queue directory that comprises an indication of one or more of a beginning address and end address for contents of a data queue associated with a destination to which said at least one data transfer operation transfers data; and
    processor operable to program said enhanced DMA to perform a desired data transfer operation and update said at least one data queue directory to reflect said data transfer operation.

17. The system of claim 16 wherein said at least one data queue directory further includes a source data queue directory that comprises:
    an indication of one or more of a beginning address and end address for contents of a data queue associated with a source from which said at least one data transfer operation transfers data.

18. The system of claim 16 further comprising:
    a source device from which data is transferred in performing said at least one data transfer operation; and a destination device to which data is transferred in performing said at least one data transfer operation.

19. The system of claim 18 wherein said enhanced DMA is operable to update said at least one data queue directory including updating both a record associated with said source device and a record associated with said destination device to reflect said at least one data transfer operation.

20. The system of claim 18 wherein said enhanced DMA is operable to update said at least one data queue directory including updating a pointer for indicating the end address of data associated with said destination device to reflect said at least one data transfer operation.

21. The system of claim 16 wherein said enhanced DMA is a chaining DMA operable to perform multiple data transfers as instructed by multiple data transfer descriptors received thereby.

22. The system of claim 16 wherein said processor is operable to program said enhanced DMA by communicating a request to said enhanced DMA, said request including at least one data transfer descriptor, said at least one data transfer descriptor includes:

identification of source address from which data is to be transferred;

identification of length of said data to be transferred; and identification of destination address to which said data is to be transferred.

23. The system of claim 16 wherein said processor is operable to program said enhanced DMA by communicating a request to said enhanced DMA, said request including at least one source record update descriptor that comprises a source record address and a value to be written to said source record address to reflect performance of said at least one data transfer operation.

24. The system of claim 16 wherein said processor is operable to program said enhanced DMA by communicating a request to said enhanced DMA, said request including at least one destination record update descriptor that comprises a destination record address and a value to be written to said destination record address to reflect performance of said at least one data transfer operation.

25. The system of claim 16 wherein said desired data transfer operation includes transferring data from a memory address associated with a source device to a memory address associated with a destination device.

26. The system of claim 25 wherein said memory address associated with a source device includes memory address associated with one device selected from the group consisting of:

peripheral device, data input device, data output device, hard disk, and digital signal processor.

27. The system of claim 25 wherein said memory address associated with a destination device includes memory address associated with one device selected from the group consisting of:

main memory and digital signal processor.

* * * * *